(12) United States Patent
Leigh-Monstevens et al.

(10) Patent No.: US 6,374,724 B1
(45) Date of Patent: Apr. 23, 2002

(54) CONCENTRICALLY MOUNTED HYDRAULIC CLUTCH SLAVE CYLINDER

(75) Inventors: Keith V. Leigh-Monstevens, Rochester Hills; Tim M. Dangel, Oxford; Bryan M. Stevens, Clinton Twp., all of MI (US)

(73) Assignee: Automotive Products (USA) Inc., Auburn Hills, MI (US)

( * ) Notice: Subject to any disclaimer, the term of this patent is extended or adjusted under 35 U.S.C. 154(b) by 0 days.

(21) Appl. No.: 09/532,639

(22) Filed: Mar. 21, 2000

(51) Int. Cl.$^7$ .............................. F01B 31/00; F16J 15/18
(52) U.S. Cl. ...................... 92/108; 92/130 R; 92/165 R
(58) Field of Search ............................... 92/108, 130 R, 92/165 R

(56) References Cited

U.S. PATENT DOCUMENTS

| | | |
|---|---|---|
| 4,566,578 A | 1/1986 | Leigh-Monstevens et al. |
| 4,585,106 A | 4/1986 | Shirley |
| 4,585,107 A | 4/1986 | Leigh-Monstevens |
| 4,585,108 A | 4/1986 | Leigh-Monstevens |
| 4,585,109 A | 4/1986 | Shirley et al. |
| 4,607,670 A | 8/1986 | Compton et al. |
| 4,609,087 A | 9/1986 | Shirley |
| 4,624,290 A | 11/1986 | Compton et al. |
| 4,624,291 A | 11/1986 | Compton et al. |
| 4,660,694 A | 4/1987 | Nix et al. |
| 4,684,003 A  * | 8/1987 | Leigh-Monstevens ........ 192/85 |
| 4,687,084 A | 8/1987 | Leigh-Monstevens et al. |
| 4,705,151 A | 11/1987 | Leigh-Monstevens et al. |
| 4,708,228 A | 11/1987 | Leigh-Monstevens et al. |
| 4,756,159 A | 7/1988 | Compton et al. |
| 4,771,874 A | 9/1988 | Leigh-Monstevens |
| 4,821,627 A | 4/1989 | Leigh-Monstevens |
| 4,827,834 A | 5/1989 | Leigh-Monstevens |
| 4,915,202 A | 4/1990 | Leigh-Monstevens et al. |
| 4,936,345 A | 6/1990 | Nix |
| 4,949,827 A | 8/1990 | Leigh-Monstevens et al. |
| 4,979,366 A | 12/1990 | Compton et al. |
| 4,991,627 A | 2/1991 | Nix |
| 4,993,529 A | 2/1991 | Leigh-Monstevens et al. |
| 4,995,492 A | 2/1991 | Babcock et al. |
| 5,018,352 A | 5/1991 | Compton et al. |
| 5,113,657 A | 5/1992 | Compton et al. |
| 5,211,099 A | 5/1993 | Grosspietsch et al. |
| 5,267,637 A | 12/1993 | Wilbur et al. |
| 5,287,951 A | 2/1994 | Voit et al. |
| RE34,987 E | 7/1995 | Compton et al. |
| 5,887,692 A  * | 3/1999 | Zelikov et al. .......... 192/91 R |
| 6,244,409 B1 | 6/2001 | Winkelmann et al. |

FOREIGN PATENT DOCUMENTS

| | | |
|---|---|---|
| DE | 19742468 A1 | 4/1999 |
| DE | 19811657 A1 | 9/1999 |
| WO | WO 97/37148 | 10/1997 |
| WO | WO 98/28552 | 7/1998 |

* cited by examiner

Primary Examiner—F. Daniel Lopez
Assistant Examiner—Michael Leslie
(74) Attorney, Agent, or Firm—Young & Basile, P.C.

(57) ABSTRACT

A concentric slave cylinder for motor vehicle manual transmissions in which the cylinder housing is fabricated from an inner cylindrical member having a base flange and an outer cylindrical member having a base flange wherein the annular fluid chamber between the outer wall of the inner cylinder and the inner wall of the outer cylinder has a radial dimension of not more than about 4 millimeters.

11 Claims, 3 Drawing Sheets

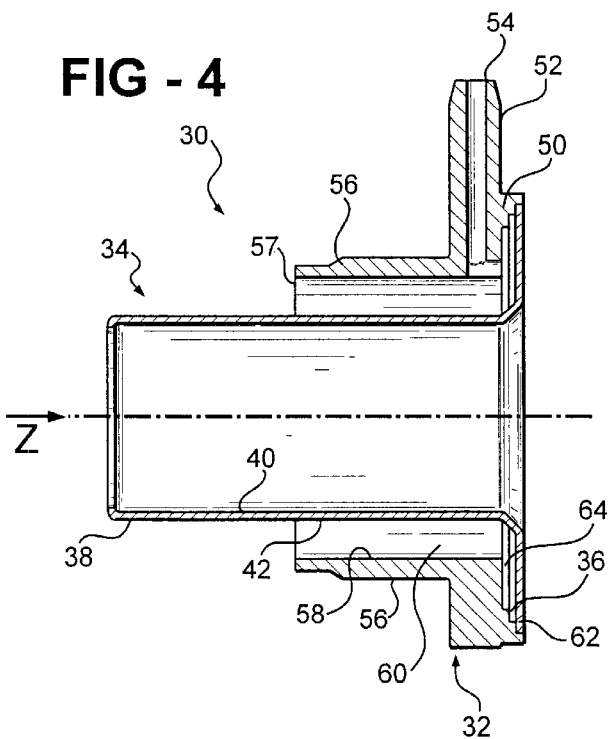
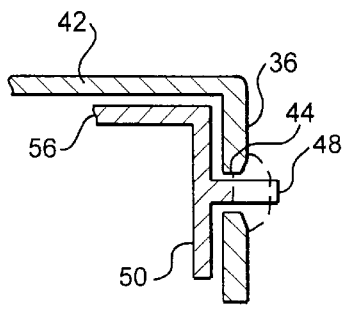
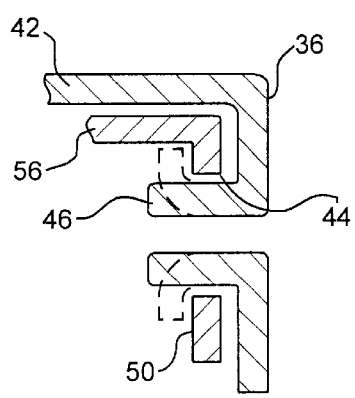
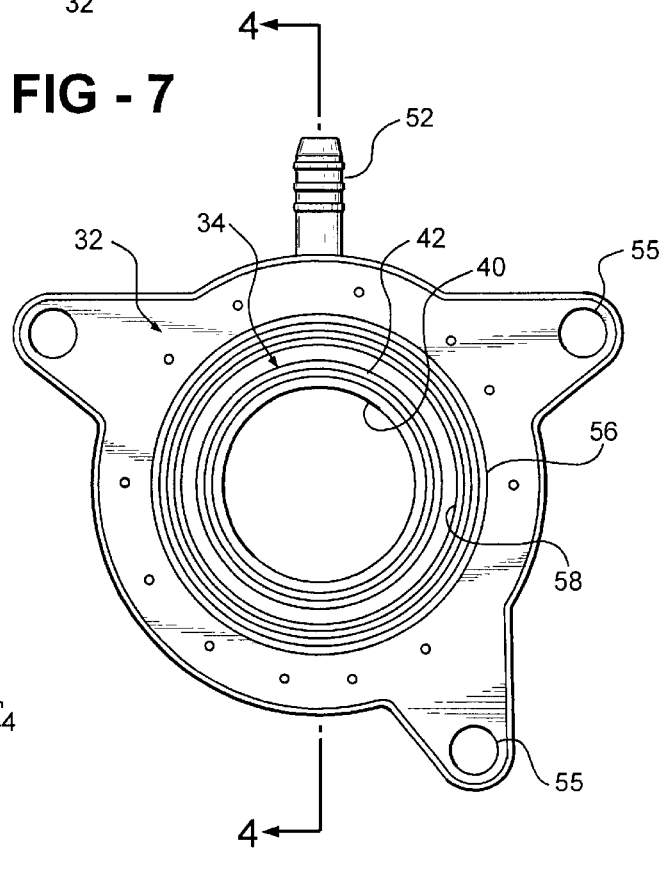

CONCENTRICALLY MOUNTED HYDRAULIC CLUTCH SLAVE CYLINDER

FIELD OF THE INVENTION

This invention relates to hydraulic clutch actuator assemblies for motor vehicle clutches and, more particularly, to a slave cylinder of the so-called "concentric" type having an improved two-piece housing which facilitates the reduction in the size, weight and cost of the overall actuator assembly.

BACKGROUND OF THE INVENTION

It is known to use a hydraulic actuator assembly consisting of a master cylinder and a slave cylinder to operate the clutch of a motor vehicle. The piston of the master cylinder is mechanically connected to the clutch pedal to move fluid through a conduit through the slave cylinder where a second piston is displaced to operate the clutch. When the pedal is released, bias springs in the clutch force the second piston back to its original position returning fluid from the slave cylinder to the master cylinder.

It is known to design slave cylinders in such a way that they may be concentrically mounted relative to the transmission input shaft within a bell-shaped housing placed between the engine and the transmission. This is generally illustrated for example in assignee's U.S. Pat. Nos. 4,585,106; 4,585,107; 4,585,108; 4,585,109; 4,609,087; 4,264,290; 4,660,694; 4,684,003; 4,687,084 and 4,708,228.

The housing in the concentric slave cylinder consists generally of two concentric cylindrical portions having a common base flange, in the case of a one-piece construction, or commonly joined base flanges in the case of a two-piece construction. The inner wall of the outer cylindrical portion is spaced from the outer wall of the inner cylindrical portion to define an annular fluid chamber which, when the assembly is completed by addition of appropriate seals, piston and bearing parts, defines the fluid volume for the concentric slave cylinder.

In prior art constructions, the radial dimension of this annular fluid chamber could not be manufactured less than about 6 mm. for one or all of the following reasons. In the case of the two-piece construction, the components were generally made of cast metal with relatively thick wall sections for adequate strength and manufacturability. In the case of a one-piece construction, the annular spacing had to be large enough to permit the entry of a tool to finish the inside surfaces to the degree necessary for proper functioning of seals and bearings.

With a 6 millimeter (mm) radial dimension for the annular fluid chamber of the slave cylinder, and piston and bearing travel; i.e., in the axial direction of the assembly, dictated by mechanical characteristics of the clutch, the overall volume of the slave cylinder annular fluid chamber became relatively large. This of course requires a larger fluid volume in the master cylinder with commensurately larger piston and housing walls as well as increased amounts of hydraulic fluid in the final assembly.

SUMMARY OF THE INVENTION

The principal objective of the present invention is to provide a hydraulic actuator assembly for motor vehicle clutches in which the fluid volumes in the master and slave cylinders are significantly reduced and the sizes, weights and manufacturing costs of the master and slave cylinders are commensurately reduced.

In general, this is accomplished by fabricating the concentric slave cylinder housing in two pieces; i.e., an inner cylindrical member having a base flange and an outer cylindrical member having a base flange wherein the annular gap or spacing between the two cylindrical portions when joined is substantially less than 6 mm. and preferably on the order of about 3 or 4 mm.

In one embodiment, the concentric slave cylinder housing includes an inexpensively manufactured stamped steel inner cylindrical member and an injection molded polymer outer cylindrical member joined together by way of overlapping and abutting base flanges. In another embodiment, both inner and outer cylindrical members are manufactured of an injection molded polymer and preferably a reinforced polymer which again are joined by way of overlapping base flanges by conventional methods.

The details of both embodiments are hereinafter described to the degree necessary to permit persons of ordinary skill in the clutch hydraulics technologies to make and use same.

BRIEF DESCRIPTION OF THE DRAWINGS

The description herein makes reference to the accompanying drawings wherein like reference numerals referred to like parts throughout the several views, and wherein:

FIG. 4 is a sectional view of the assembled housing taken along line B—B in FIG. 7;

FIG. 5 is a partial sectional view of an alternate aspect showing fastening of the inner member to the outer member;

FIG. 6 is a partial sectional view of an alternate aspect showing fastening of the inner member to the outer member; and FIG. 7 is a side view taken in the direction of Z in FIG. 4.

DESCRIPTION OF THE PREFERRED EMBODIMENT

Figure 1:
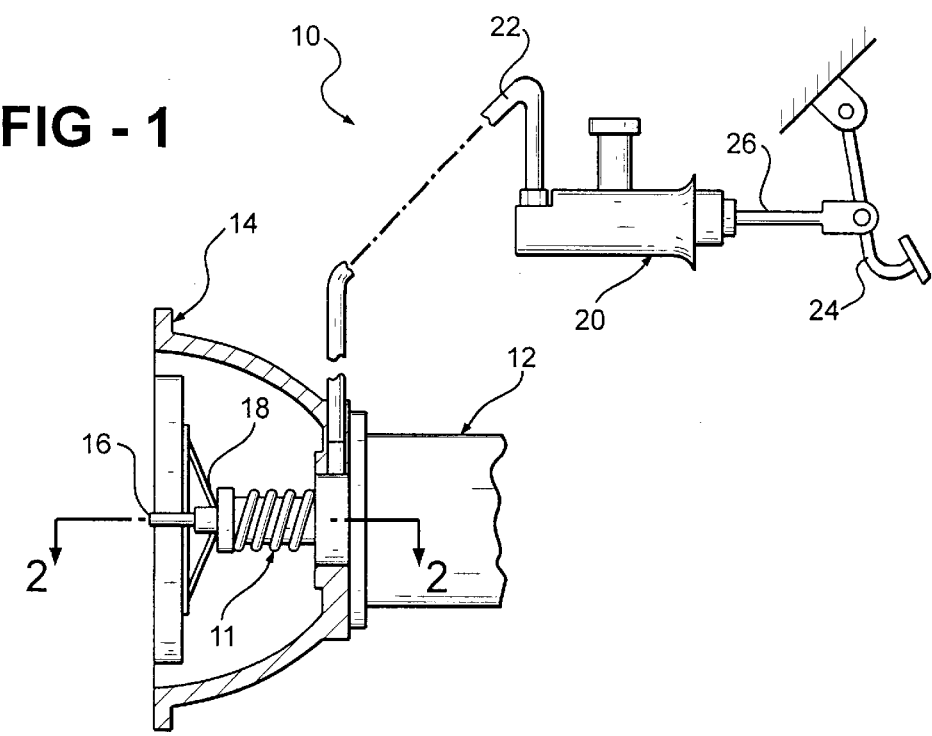
FIG. 1 is a partial cut away view of a hydraulic clutch actuation system.
Figure 2:
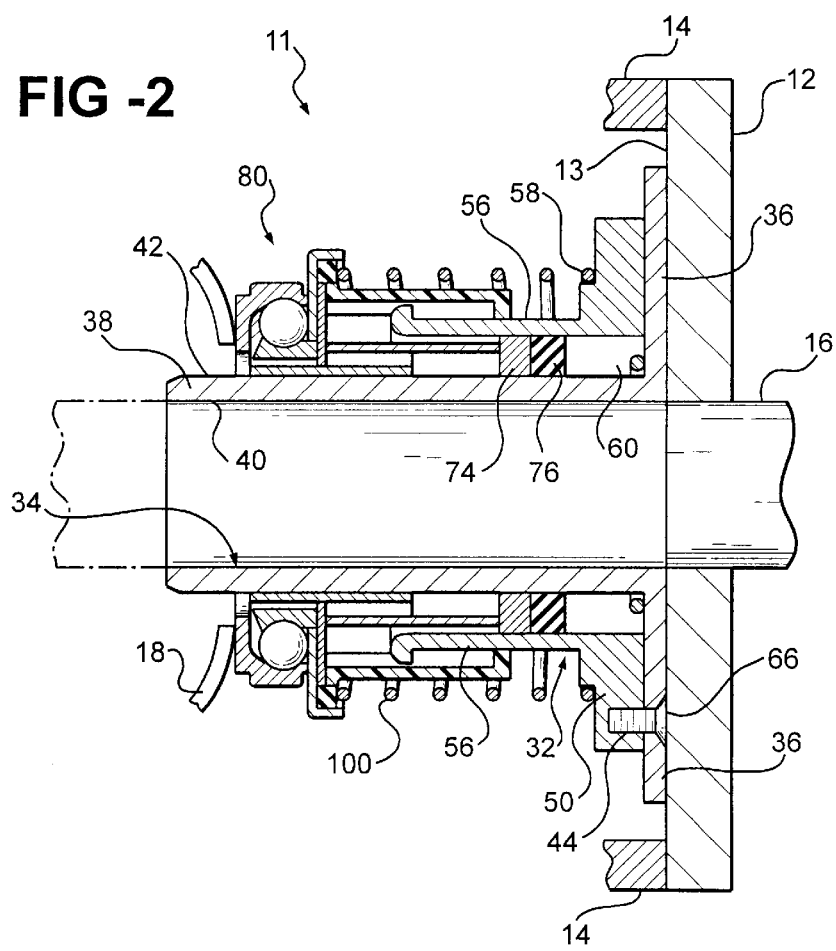
FIG. 2 is a sectional view taken along line A—A in FIG. 1.

Referring to FIGS. 1 and 2, a hydraulic clutch actuator system 10 is illustrated. Actuator system 10 includes a concentric slave cylinder 11 positioned within a clutch bell casing 14. The bell casing 14 is positioned between and attaches to the forward end of a transmission casing 12 and a rearward end of a motor vehicle engine, not shown. The concentric slave cylinder 11 surrounds a transmission input shaft 16 which extends axially from the motor vehicle engine, not shown, through the slave cylinder 11 and into the transmission casing 12 as shown in FIGS. 1 and 2. Actuator system 10 further includes a master cylinder 20 connected to the slave cylinder 11 by a conduit 22 placing the master cylinder 20 in fluid flow communication with the slave cylinder 11. Master cylinder 20 is connected to a clutch pedal 24 in the passenger compartment of the motor vehicle by a piston rod 26 as show in FIG. 1.

Figure 3:
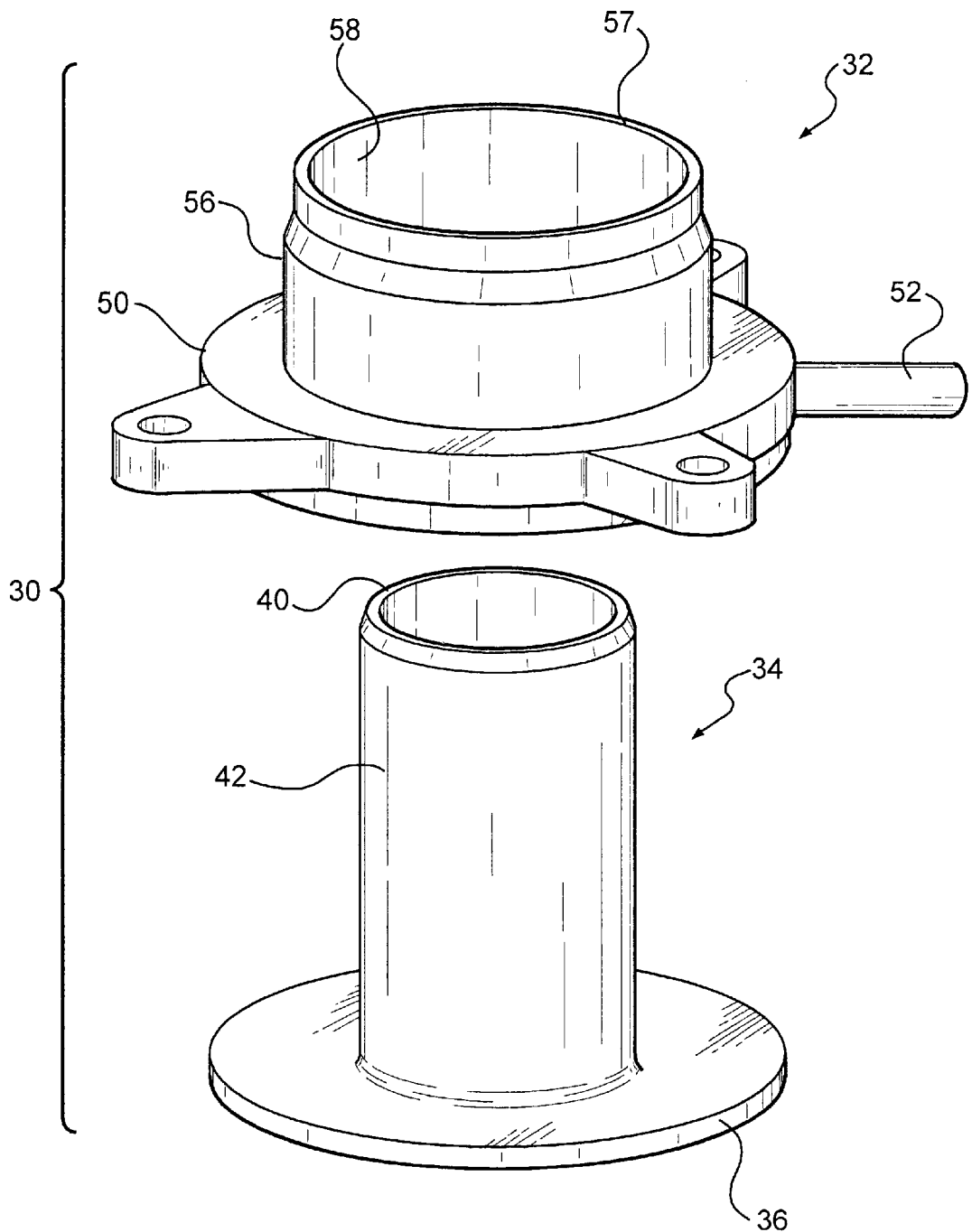
FIG. 3 is an exploded view of the concentric slave cylinder housing.

Referring to FIGS. 2, 3 and 4, in a preferred aspect of the invention, slave cylinder 11 includes a housing 30 having an outer cylindrical member 32 and an inner cylindrical member 34. Inner cylindrical member 34 includes an integral base flange 36 extending radially outward from one end of the inner member 34. Inner member 34 includes a first axial bore 40 extending through the long axis and base 36 as best seen in FIGS. 3 and 4. First bore 40 is slightly larger than the diameter of input shaft 16 as seen in FIG. 2. As seen in FIGS. 3 and 4, inner member 34 has a relatively smooth outer cylindrical surface 42, a portion of which defines an inner piston surface. The rearward face of base flange 36 of inner member 34 mounts to the forward surface 13 of transmission casing 12 within bell casing 14 as best seen in FIG. 2.

Concentric slave cylinder housing 30 further includes an outer cylindrical member 32 having an integral base flange 50 extending radially outward from an end of outer member 32 as best seen in FIGS. 3 and 4. Outer member 32 includes a second axial bore extending through the long axis and base flange 50. Second bore 57 is slightly greater in diameter than the outer surface 42 as described below. Referring to FIGS. 4 and 7, outer member 32 defines a fluid port 52 having a channel 54 in fluid flow communication with second bore 57. Base flange 50 further includes a plurality of mounting apertures 55. Second through bore 57 defines a smooth inner cylindrical surface 58 as best seen in FIG. 4.

Preferably, outer cylindrical surface 42 and inner cylindrical surface 58 and the forward surface of base flange 36 define an annular fluid chamber 60 as best seen in FIG. 4. The radial dimension or width of the annular fluid chamber 60 between the outer cylindrical surface 42 and inner cylindrical surface 58 is no more than about 4 mm. and is preferably about 3 to 4 mm. The preferred annular fluid chamber 60 significantly reduces the overall size or diameter of the outer member 32 and concentric slave cylinder 11. The reduction in size or volume of annular piston chamber 60 provides additional benefits of requiring less hydraulic fluid to fill chamber 60 and thereby allows a reduction in size of master cylinder 20 which further reduces the space requirements and weight of the entire clutch hydraulic actuator system 10.

In a preferred aspect, inner cylindrical member 34 is fabricated from steel which can be stamped to form internal base flange 36 and drawn to form inner member 34 without a substantial reduction in wall section or strength. The preferred steel material provides the advantages of thin wall sections on the order of about 1 to 1.5 mm. thick, with about 1 mm. being preferred, over that of prior materials used such as cast iron and aluminum as well as injection molded polymers which typically were 3 mm. or greater in thickness. Although approximately 1 mm. thick wall sections are preferred, it is contemplated that thicker or thinner steel may be used to achieve the strength, size and weight characteristics for a particular application as described herein. The preferred steel material further reduces the size or outside diameter of inner member 34 thereby allowing a reduction in size of the outer cylindrical member 32 and of the housing 30 as a whole. The reduced wall section thickness also reduces the axial length of the housing 30 through reduced thickness in the base flange 36. The preferred steel material further reduces weight due to the thin wall section. Although steel is the preferred material, it is contemplated that other lightweight, high strength ferrous and non-ferrous alloy materials may be used to achieve the desired size and weight reducing characteristics previously described.

In an alternative aspect of the invention, inner member 34 may be fabricated from materials including polymers, for example, glass reinforced Nylon that can satisfy or improve upon prior art size and weight deficiencies. Other suitable polymer materials, for example, include polyamide-imide, polyetheretherketone, and polyphenylene sulfide. The alternative polymeric material is advantageous in its ability to form complex geometries and relatively thin wall sections while reducing weight and secondary manufacturing operations over other conventional materials such as cast iron and aluminum.

In a preferred aspect, outer member 32 is fabricated from a polymeric material, for example, an injection molded glass reinforced Nylon. Other suitable polymer materials, for example, include polyamide-imide, polyetheretherketone, and polyphenylene sulfide. Preferably, the nominal thickness of the outer member 32 is approximately 3 mm. although it is contemplated that thicker or thinner areas may be used to achieve the size, strength and weight characteristics described herein. The preferred polymeric material has advantages of forming relatively thin wall sections and complex geometries, reducing size, weight, and secondary manufacturing processes while and maintaining strength over other conventional materials such as aluminum or cast iron.

Referring to FIGS. 2, 3 and 4, outer cylindrical member 32 is preferably assembled and joined to inner cylindrical member 34 by inserting inner member 34 through second bore 57 of outer member 32 such that base flange 50 rests upon base flange 36 of inner member 34 compressing an annular O-ring seal 64 positioned in an annular groove 62 in annular base 50 as best seen in FIG. 4. Upon assembly and joining through the base flanges, inner member 34, outer member 32, first bore 40 and second bore 57 are in concentric relationship to one another as best seen in FIGS. 4 and 7.

Inner member 34 may be permanently or removably attached to outer member 32 by many known conventional methods. Preferably, as shown in FIG. 2, base flange 36 of inner member 34 may include two or more apertures 44 allowing a conventional fastener such as bolt or a screw 66 to pass through and engage the base flange 50 to further compress O-ring seal 64 and place outer member 32 in tight surface and sealing engagement with inner member 34. As shown in FIGS. 5 and 6, alternately, base flange 50 of outer member 32 may include two or more raised projections 48 extending rearward to coincide with aligned apertures 44 in mounting portion 36 as shown in FIG. 5. In this aspect, projection 48 could be cold-headed or deformed, shown in dashed line, to secure outer member 32 to inner member 34 as previously described. In an alternate aspect, as shown in FIG. 6, base flange 36 may include deformable tabs 46 extending forward and passing through apertures 44 in base flange 50 as shown in FIG. 6. Tabs 46 could be deformed, shown in dashed line, to secure outer member 32 to inner member 34 as previously described. As it would be understood by those skilled in the art, there are many other methods available to secure the inner and outer members such as mechanical staking or the use of adhesives or other welding and bonding techniques suitable for the member materials used. Inner 34 and outer 32 members are attached to the transmission casing 12 by common fasteners through mounting apertures 55 confining inner member 34 there between.

Referring to FIG. 2, the concentric slave cylinder 11 further includes annular piston means 74 in fluid chamber 60. Slave cylinder 11 further includes annular piston seal means 76 in sliding engagement in the fluid chamber 60 with outer surface 42 and inner surface 58. Piston seal 76 and O-ring seal 62 provide a fluid-tight seal preventing hydraulic fluid from leaking from piston chamber 60 to the exterior of slave cylinder 11 other than through fluid port 54.

Concentric slave cylinder 11 further includes a release bearing means 80 attached to said piston means 74. The concentric slave cylinder 11 further includes a preload compression coil spring 100 which biases the annular piston 76 to the extreme and forward extent of fluid chamber 60 as shown in FIG. 2. Upon installation in the vehicle, clutch spring fingers 18 counteract and compress spring 100 forcing piston and seal 76 rearward into the fluid chamber. Upon disengaging the clutch through pressure on pedal 24, fluid pressure forces piston 74 forward to the extreme end of fluid chamber 60 further compressing diaphragm spring fingers 18 which separate the clutch pressure plate from the friction plate, not shown, to disengage the transfer of energy from the motor vehicle engine, not shown, through the transmission input shaft 16 to the transmission as shown in FIG. 1.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A concentric slave cylinder assembly comprising:

a housing comprising an inner cylindrical member having an integral flange extending radially outwardly from one end thereof and a smooth outer cylindrical surface, and an outer cylindrical member having an integral flange extending radially outwardly from one end thereof and a smooth cylindrical inner surface;

said inner and outer cylindrical members being joined by way of said integral flanges in concentric relationship to define between the outer surface of the inner cylindrical member and the inner surface of the outer cylindrical member, an annular fluid chamber having a radial dimension of not more than about 4 mm, said inner and outer members being formed of different materials and one of said members being fabricated from a polymer;

a fluid seal disposed within said fluid chamber; and means defining a fluid port from the interior of the fluid chamber to the exterior of said outer cylindrical member.

2. The concentric slave cylinder of claim 1 wherein said integral flange portions are joined by two or more fasteners.

3. The concentric slave cylinder of claim 1 wherein said one member is the outer member and said inner cylindrical member is fabricated as a cold formed metal.

4. The concentric slave cylinder of claim 3 wherein the inner cylindrical member comprises a steel stamping.

5. A concentric slave cylinder housing having an inner cylindrical member having an integral flange extending radially outward from one end thereof and a smooth outer cylindrical surface, and an outer cylindrical member having an integral flange extending radially outward from one end thereof and a smooth inner cylindrical surface, characterized in that:

an annular fluid chamber is defined by said inner member outer cylindrical surface and said outer member inner cylindrical surface;

said fluid chamber has a radial dimension of not more than about 4 mm,:

said inner and outer members are formed of different materials; and one of said members is fabricated as a polymer.

6. The concentric slave cylinder of claim 5 wherein said one member comprises the outer cylindrical member and said inner cylindrical member is fabricated from steel.

7. A concentric slave cylinder assembly comprising:

a housing comprising an inner cylindrical member having an integral flange extending radially outwardly from one end thereof and a smooth outer cylindrical surface, and an outer cylindrical member having an integral flange extending radially outwardly from one end thereof and a smooth cylindrical inner surface;

said inner and outer cylindrical members being joined by way of said integral flanges in concentric relationship to define between the outer surface of the inner cylindrical member and the inner surface of the outer cylindrical member an annular fluid chamber having a radial dimension of not more than about 4 mm;

a fluid seal disposed within said fluid chamber; and means defining a fluid port from the interior of the fluid chamber to the exterior of said outer cylindrical member;

said integral flanges being joined by two or more deformable projections in said outer cylindrical member flange, said inner cylindrical member having two or more apertures aligned with said projections, said projections extending through said apertures and being deformed to a size larger than said aperture.

8. A concentric slave cylinder assembly comprising:

a housing comprising an inner cylindrical member having an integral flange extending radially outwardly from one end thereof and a smooth outer cylindrical surface, and an outer cylindrical member having an integral flange extending radially outwardly from one end thereof and a smooth cylindrical inner surface;

said inner and outer cylindrical members being joined by way of said integral flanges in concentric relationship to define between the outer surface of the inner cylindrical member and the inner surface of the outer cylindrical member an annular fluid chamber having a radial dimension of not more than about 4 mm, the outer cylindrical member being fabricated from a polymer;

a fluid seal disposed within said fluid chamber; and means defining a fluid port from the interior of the fluid chamber to the exterior of said outer cylindrical member.

9. A concentric slave cylinder assembly comprising:

a housing comprising an inner cylindrical having an integral flange extending radially outwardly from one end thereof and a smooth outer cylindrical surface, and an outer cylindrical member having an integral flange extending radially outwardly from one end thereof and a smooth cylindrical inner surface;

said inner and outer cylindrical member being joined by way of said integral flanges in concentric relationship to define between the outer surface of the inner cylindrical member and the inner surface of the outer cylindrical member an annular fluid chamber having a radial dimension of not more than about 4 mm, the inner cylindrical member and the outer cylindrical member being fabricated from a polymer;

a fluid seal disposed within said fluid chambers; and means defining a fluid port from the interior of the fluid chamber to the exterior of said outer cylindrical member.

10. A concentric slave cylinder housing having an inner cylindrical member having an integral flange extending radially outward from one end thereof and a smooth outer cylindrical surface; an outer cylindrical member having an integral flange extending radially outward from one end thereof and a smooth inner cylindrical surface, said housing comprising:

an annular fluid chamber defined by said inner member outer cylindrical surface and said outer member inner cylinder surface, said fluid chamber having a radial dimension of not more than about 4 mm, said outer cylindrical member being fabricated from a polymer and including means defining a fluid port from the interior of said fluid chamber to the exterior of said outer cylindrical member.

11. A concentric slave cylinder housing having an inner cylindrical member having an integral flange extending radially outward from one end thereof and a smooth outer cylindrical surface; an outer cylindrical member having an integral flange extending radially outward from one end thereof and a smooth inner cylindrical surface, said housing comprising:

an annular fluid chamber defined by said inner member outer cylindrical surface and said outer member inner cylindrical surface, said fluid chamber having a radial dimension not more than about 4 mm, said inner and outer members being fabricated from a polymer.

* * * * *